US012234968B2

(12) United States Patent
de JD Melhado-Moya

(10) Patent No.: US 12,234,968 B2
(45) Date of Patent: Feb. 25, 2025

(54) ILLUMINATION DEVICE WITH A LIVING HINGE

(71) Applicant: Flex-N-Gate Advanced Product Development, LLC, Windsor (CA)

(72) Inventor: Felipe de JD Melhado-Moya, Novi, MI (US)

(73) Assignee: Flex-N-Gate Advanced Product Development, LLC, Windsor (CA)

( * ) Notice: Subject to any disclaimer, the term of this patent is extended or adjusted under 35 U.S.C. 154(b) by 0 days.

(21) Appl. No.: 18/611,863

(22) Filed: Mar. 21, 2024

(65) Prior Publication Data

US 2024/0318808 A1 Sep. 26, 2024

Related U.S. Application Data

(60) Provisional application No. 63/491,451, filed on Mar. 21, 2023.

(51) Int. Cl.

| | |
|---|---|
| ***F21V 17/10*** | (2006.01) |
| ***F21S 41/19*** | (2018.01) |
| ***F21S 41/29*** | (2018.01) |
| ***F21S 45/00*** | (2018.01) |
| ***F21V 15/01*** | (2006.01) |

(52) U.S. Cl.

CPC ............ *F21V 17/107* (2013.01); *F21S 41/19* (2018.01); *F21S 41/295* (2018.01); *F21S 45/00* (2018.01); *F21V 15/01* (2013.01)

(58) Field of Classification Search

CPC ...... F21V 17/107; F21V 15/01; F21S 41/295; F21S 41/19; F21S 45/00

See application file for complete search history.

(56) References Cited

U.S. PATENT DOCUMENTS

| | | | |
|---|---|---|---|
| 5,669,695 A | 9/1997 | Parker et al. | |
| 9,841,158 B2 | 12/2017 | Bauer et al. | |
| 10,253,930 B2 * | 4/2019 | Den Boer | F21V 23/02 |
| 10,442,345 B2 | 10/2019 | Ito et al. | |
| 2005/0006917 A1 * | 1/2005 | Sparks | B60N 2/0228 296/1.02 |
| 2010/0155135 A1 * | 6/2010 | Yamamoto | B60Q 3/51 174/536 |

(Continued)

FOREIGN PATENT DOCUMENTS

| | | |
|---|---|---|
| CN | 102345823 A | 2/2012 |
| EP | 3299219 A1 | 3/2018 |

(Continued)

OTHER PUBLICATIONS

Extended European Search Report issued Jun. 24, 2024 in European Patent Application No. 24164871.6.

*Primary Examiner* — Christopher E Dunay
(74) *Attorney, Agent, or Firm* — Avek IP, LLC

(57) ABSTRACT

An illumination device for use with a motor vehicle includes a housing having a first side and a second side connected via a hinge, the hinge to allow the first side and the second side to fold together to form a closed configuration of the housing; and one or more internal components to secure within the housing when in the closed configuration; the first side, the second side, and the hinge are manufactured as a single unit; and the housing is to mount within an environment of the motor vehicle.

16 Claims, 10 Drawing Sheets

(56) References Cited

U.S. PATENT DOCUMENTS

| | | | | |
|---|---|---|---|---|
| 2012/0195025 | A1* | 8/2012 | Gerolemou | F21V 21/145 362/103 |
| 2019/0093865 | A1* | 3/2019 | Walser | F21V 14/065 |
| 2020/0148104 | A1 | 5/2020 | Ito et al. | |
| 2022/0185173 | A1* | 6/2022 | Och | B60Q 3/30 |
| 2024/0166173 | A1* | 5/2024 | Escher | B60K 26/02 |

FOREIGN PATENT DOCUMENTS

| | | | |
|---|---|---|---|
| EP | 3715706 | A1 | 9/2020 |
| WO | 2020026753 | A1 | 2/2020 |

* cited by examiner

ILLUMINATION DEVICE WITH A LIVING HINGE

CROSS-REFERENCE TO RELATED APPLICATIONS

This application claims the benefit of priority of U.S. Provisional Patent Application No. 63/491,451, filed on Mar. 21, 2023, the disclosure of which is herein incorporated by reference in its entirety.

BACKGROUND

1. Field

Embodiments of the disclosure relate to lighting systems, and in particular to an illumination device for use in motor vehicles, the illumination device having a living hinge for improved efficiency of manufacturing.

2. Related Art

Illumination devices for use in motor vehicles are known in the prior art. For example, U.S. Pat. No. 9,841,158 to Bauer et al. discloses a light module for a motor vehicle having two reflectors connected by two hinges. European Patent Publication No. EP 3715706A1 to Camacho et al. discloses an optic reflector for an automotive lighting device joined by a foldable portion. U.S. Pat. No. 10,442,345 to Ito et al. discloses a vehicular lamp with a base portion with a plurality of hinges.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In some aspects, the present disclosure relates to an illumination device for use with a motor vehicle, the illumination device comprising a housing having a first side and a second side connected via a hinge, the hinge configured to allow the first side and the second side to fold together to form a closed configuration of the housing; and one or more internal components configured to secure within the housing when in the closed configuration. Wherein the first side, the second side, and the hinge are manufactured as a single unit; and wherein the housing is configured to mount within an environment of the motor vehicle.

In other aspects, the present disclosure relates to a method of assembling an illumination device for use with a motor vehicle. The method comprises manufacturing a housing having a first side and a second side connected via a hinge, the first side, the second side, and the hinge manufactured as a single unit. Then, securing one or more internal components to one or more of the first side and the second side of the housing. Next, folding the first side and the second side together about the hinge, and securing the first side and the second side together to create a closed configuration of the housing, wherein the one or more internal components are affixed within the housing in the closed configuration. And then, installing one or more external components to the housing in the closed configuration to render an assembled illumination device, wherein the assembled illumination device is configured for installation within an environment of the motor vehicle.

BRIEF DESCRIPTION OF THE DRAWING FIGURES

Embodiments of the invention are described in detail below with reference to the attached drawing figures, wherein.

Figure 1:
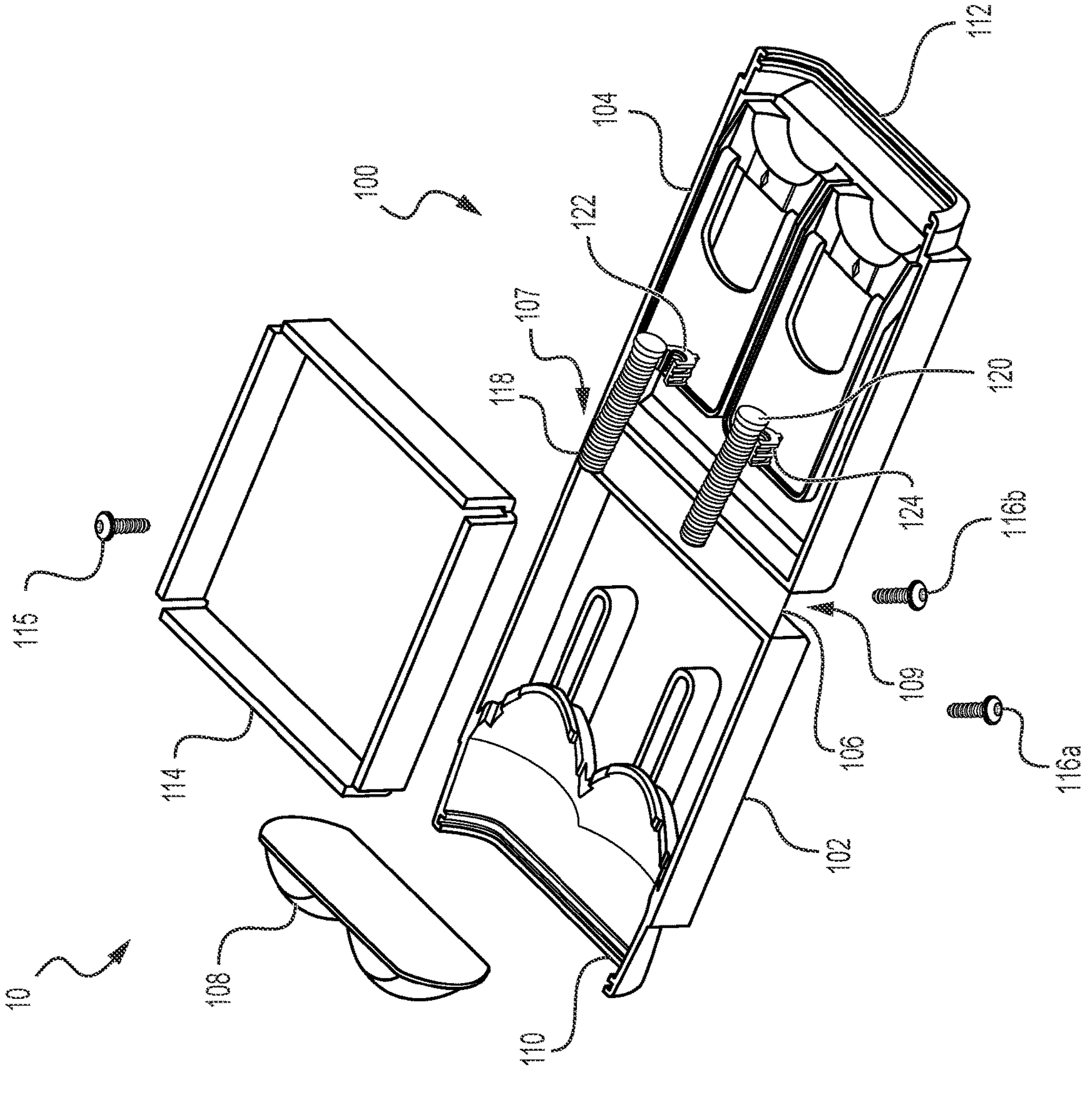
FIG. 1 is a perspective view of an embodiment of an illumination device in accordance with the present invention in a disassembled configuration.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Lighting systems for motor vehicles are well known and include headlights that are generally classified as either projector headlights or reflector headlights. Headlights are positioned at the front of a vehicle and provide visibility in dark or otherwise less than ideal driving conditions. Generally, a projector headlight includes one or more lenses that allow for light to focus better. This is contrasted with conventional reflector headlights which are generally configured to cover a wider area yet are less focused and intense.

Vehicles also include additional lighting systems, such as rear facing lights, car door lights, and interior lights. These can further increase visibility when driving conditions are less than ideal.

The present invention is directed toward an illumination device, which may be adapted for use in a plurality of motor vehicles environments and for various purposes as would be understood by those skilled in the art. In at least some embodiments, the illumination device is configured as a vehicle projector headlight. The illumination device of the present disclosure includes a housing having two sides connected via a hinge, wherein the two sides fold together to form an enclosure for components, such as light(s), lens(es), and/or shield(s). The hinge is integral with the two sides, located near a midline of the housing, and in embodiments, composed of the same material as the two sides, such as being manufactured through injection molding or similar processes. This allows for the hinge to function for a single use fold during assembly of the housing. In embodiments, the hinge is not configured to allow for continued opening and closing, but rather is designed for a one-time fold and therefore simplifies assembly of the housing.

FIGS. 1 through 6 depict an illumination device 10 in accordance with the present disclosure. The illumination device 10 includes a housing 100 having a first side 102 and a second side 104 connected via a hinge 106. The hinge 106 is located near a midline of the housing 100, such that the first side 102 and the second side 104 are similar in size and dimensions. The hinge 106 is a single use living hinge molded into and integral with the housing 100, such that the hinge 106 allows for the sides 102, 104 to fold together during assembly. The two sides 102, 104 and the hinge 106 are a single, unified body, which is constructed during manufacturing (e.g. through injection molding). In other words, the sides 102, 104 and hinge 106 are never separate components that have to be connected for use. This feature simplifies the assembly process of the projector 10 by reducing the number of parts needed to complete assembly.

Further, in embodiments, the sides 102, 104 and the hinge 106 are composed of a single material, which may be selected from any suitable material as would be understood by those skilled in the art, such as polycarbonates or plastics. Since the hinge 106 is only required to function once during assembly (i.e. a single fold to close the housing), the hinge 106 can be composed of a rigid material, such as a polycarbonate, as compared to a conventional hinge which may be composed of a flexible material to allow for continued opening and closing. Alternatively, the hinge 106 and the housing sides 102 and 104 could be formed of a relatively flexible material for the purpose of retaining integrity during or after being collapsed. Further still, embodiments are possible in which the hinge 106 is constructed of a material different than sides 102 and 104, the material connecting the sides together and accomplishing the same function upon collapse of the sides.

Figure 3:
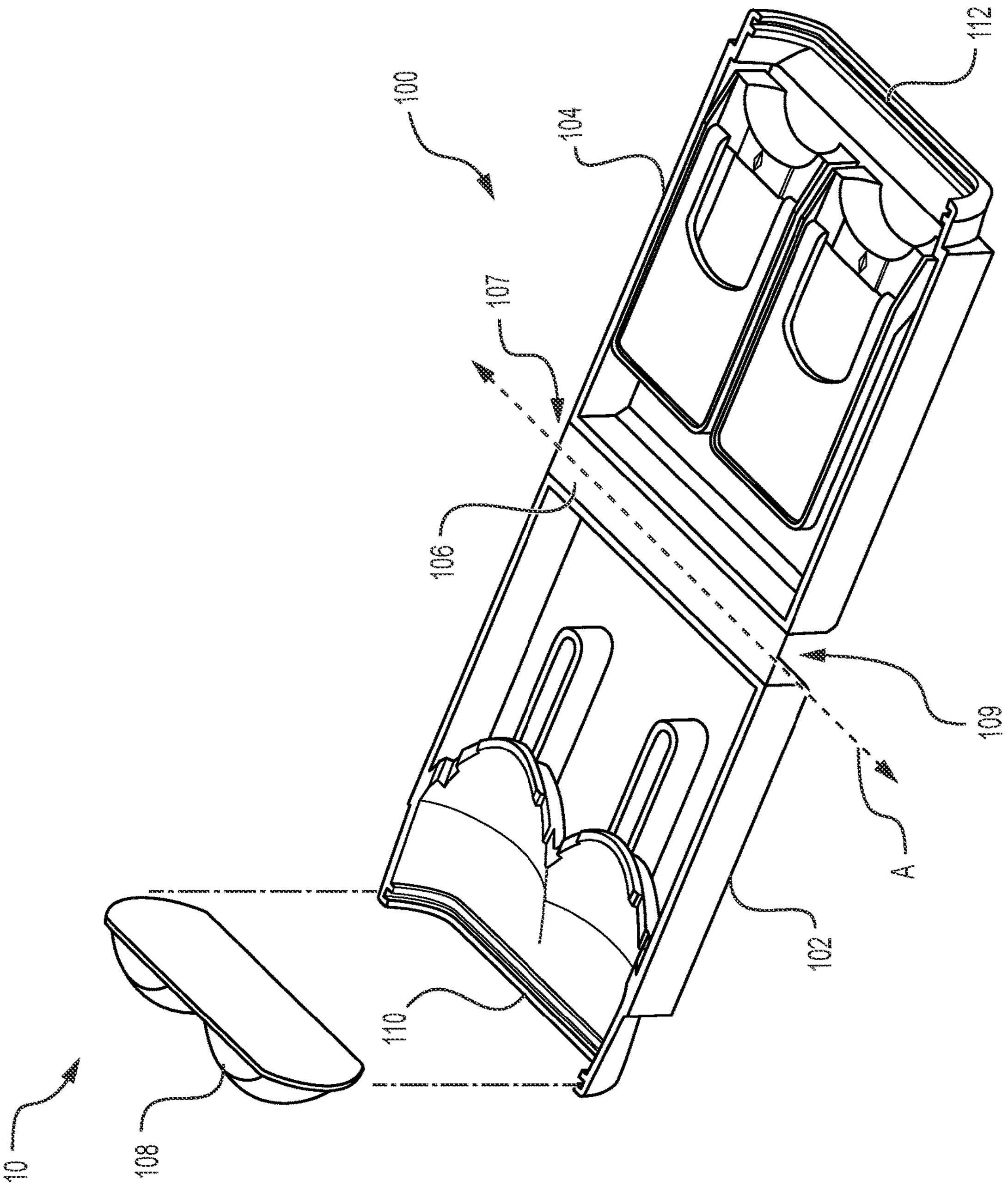
FIG. 3 is a front perspective view a housing and a lens of the illumination device of FIG. 1.

As best shown in FIG. 3, the hinge 106 is shown as a single and solid hinge, extending from a first end 107 to a second end 109, and therefore the width of the hinge 106 is substantially equal to a width of the housing 100. It is contemplated however that the hinge 106 may vary, and may be composed of multiple, smaller hinges (or connection points), such as two or three connection points each connecting the sides 102, 104. Regardless, the function is the same, to provide for a single fold or bend of the housing 100 during assembly. As previously discussed, the hinge 106 is located along a midline (A), which allows for the housing 100 to easily bend about the midline (A) such that the sides 102, 104 align once folded together. The hinge 106 may include a weak line, such as an area composed of a thinner thickness of material, thereby ensuring that a bend happens in an exact desired line.

Figure 2:
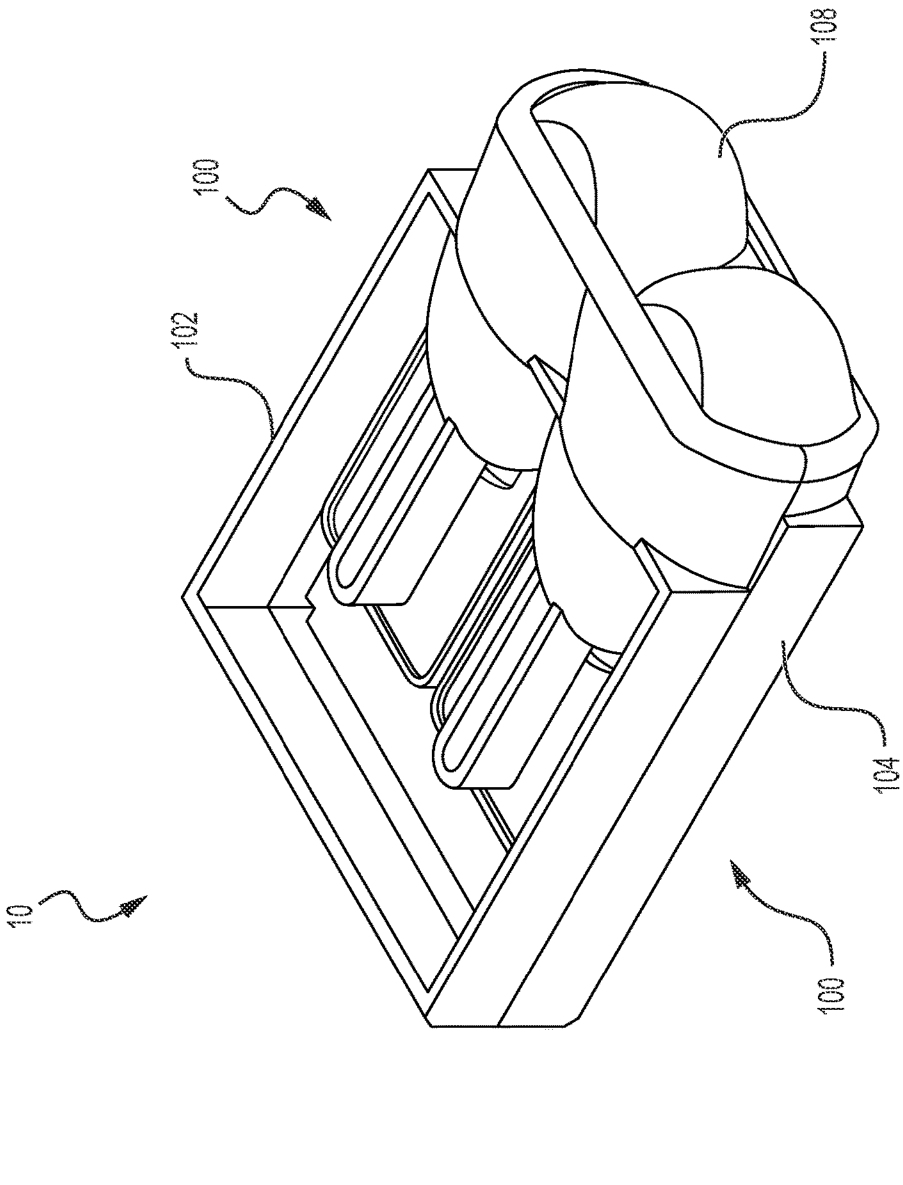
FIG. 2 is a front perspective view of the illumination device of FIG. 1.

Illumination device 10 further includes at least one lens 108 which secures within the housing 100 when in a closed configuration, as shown in FIG. 2. In embodiments, the sides 102, 104 include channels 110, 112 to receive and hold the lens 108, as shown in FIG. 3. These channels 110, 112 are again directly embedded into the housing during manufacturing, such that no additional securement devices or alterations are necessary during assembly of the illumination device. The lens 108 can be composed of any suitable transparent material, and can vary in shape and design as would be understood by those skilled in the art.

Figure 4:
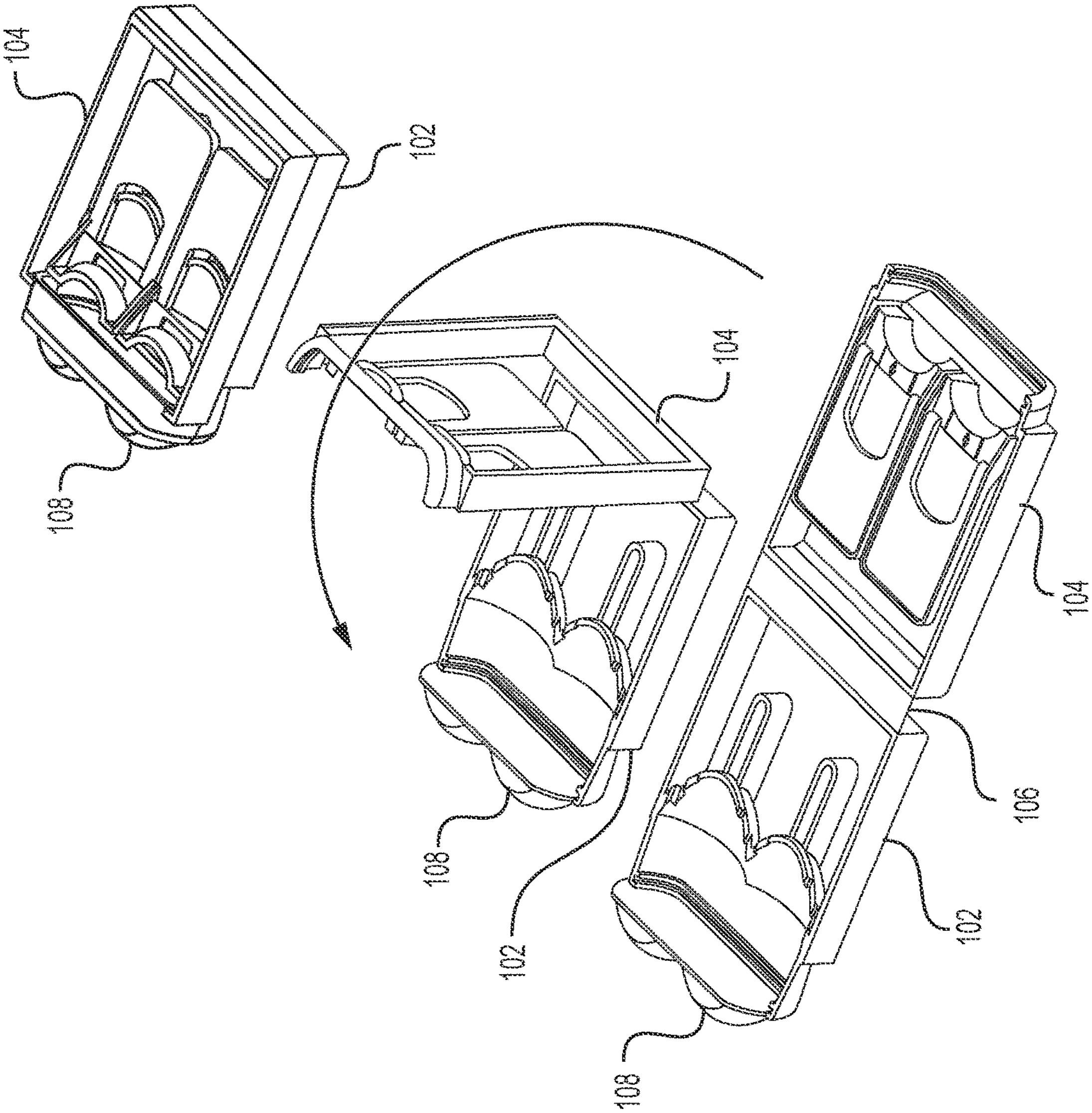
FIG. 4 shows three steps of folding the housing of FIG. 3 about a hinge in accordance with the present invention.

As shown in FIG. 4, after manufacturing the housing 100, and during assembly of the illumination device 10, one of the sides 102, 104 will receive the lens 108 via the channel 110. As necessary, additional internal components may be secured or placed into one of the sides 102, 104. The hinge 106 is then used to fold the sides 102, 104 together to fully secure the lens 108 and other internal components in place, wherein the second channel 112 receives an opposing edge of the lens 108. In embodiments, one or more clips or snaps (not shown) may extend from the sides 102, 104 to secure the sides together in a closed configuration, again where said clips/snaps are also integral with the housing 100. Other components necessary for the functioning of illumination device 10, may further be enclosed within or added to the housing 100 during this assembly process.

Figure 5:
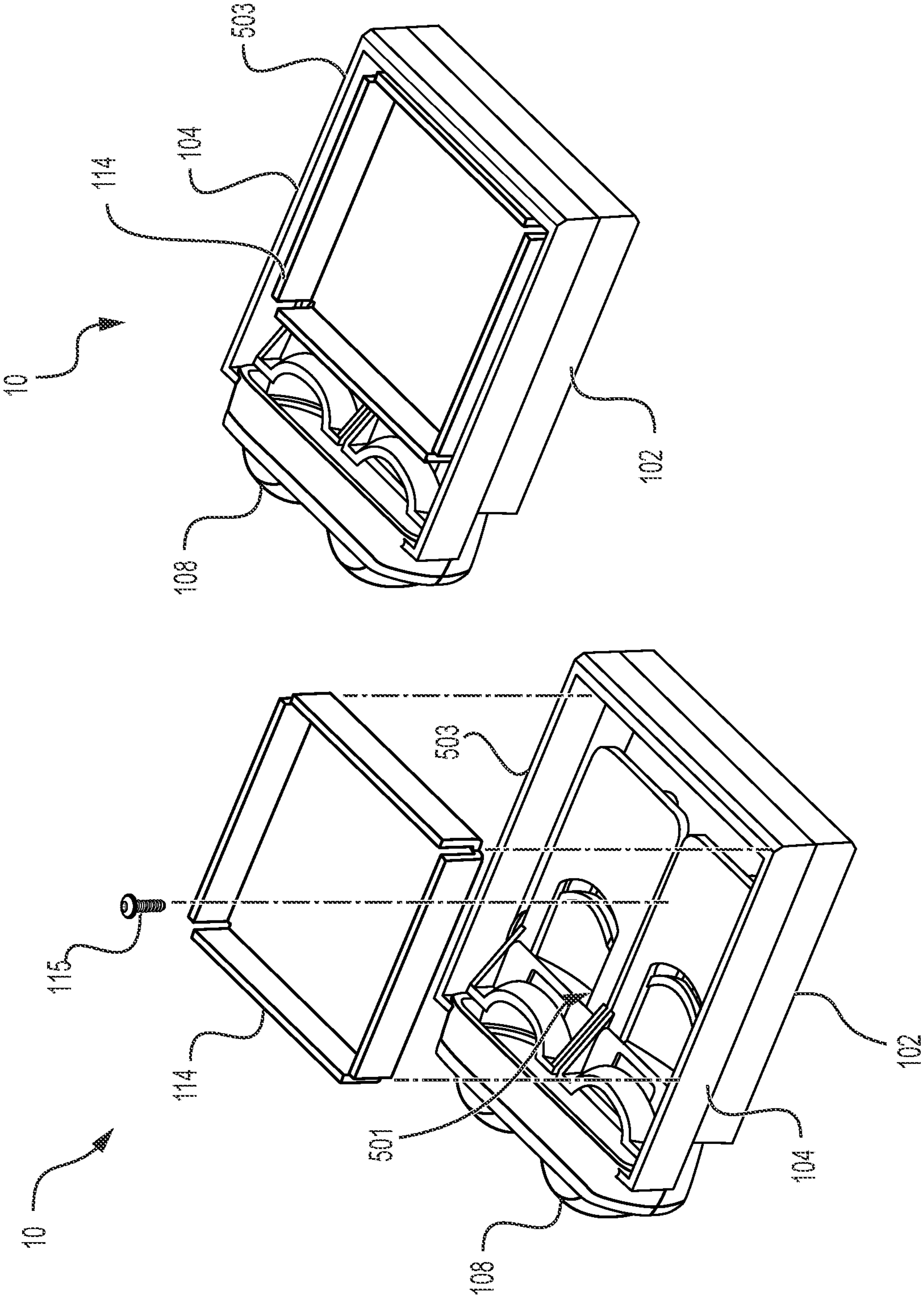
FIG. 5 shows two steps of inserting a light engine into the housing of the illumination device of FIG. 1.

As best shown in FIGS. 1 and 5, illumination device 10 further includes a light engine 114 which can vary, and will include necessary lighting components, such as LEDs, electrical and mechanical fixings, circuits, or other components as would be understood by those skilled in the art. The light engine 114 is secured to the housing 100 and provides light for emitting through the lens 108. Securing the light engine 114 may be achieved via one or more fasteners 115, such as one or more screws, bolts, or other fasteners. In the embodiment shown in FIGS. 1-6, the light engine 114 is placed within a receptacle 501 of the housing 100. The receptacle 501 is recessed into side 104 and allows for the light engine 114 to rest therein and be at least partially surrounded by side walls 503 of side 104. Those skilled in the art will understand that a variety of means to incorporate the light engine 114 may be utilized based on manufacturing, functional, and practical considerations.

Illumination device 10 may further include one or more threaded fasteners 118, 120 positioned within flexible holders 122, 124. The threaded fasteners 118, 120 provide for longitudinal adjustment of a shield (not shown).

Figure 6:
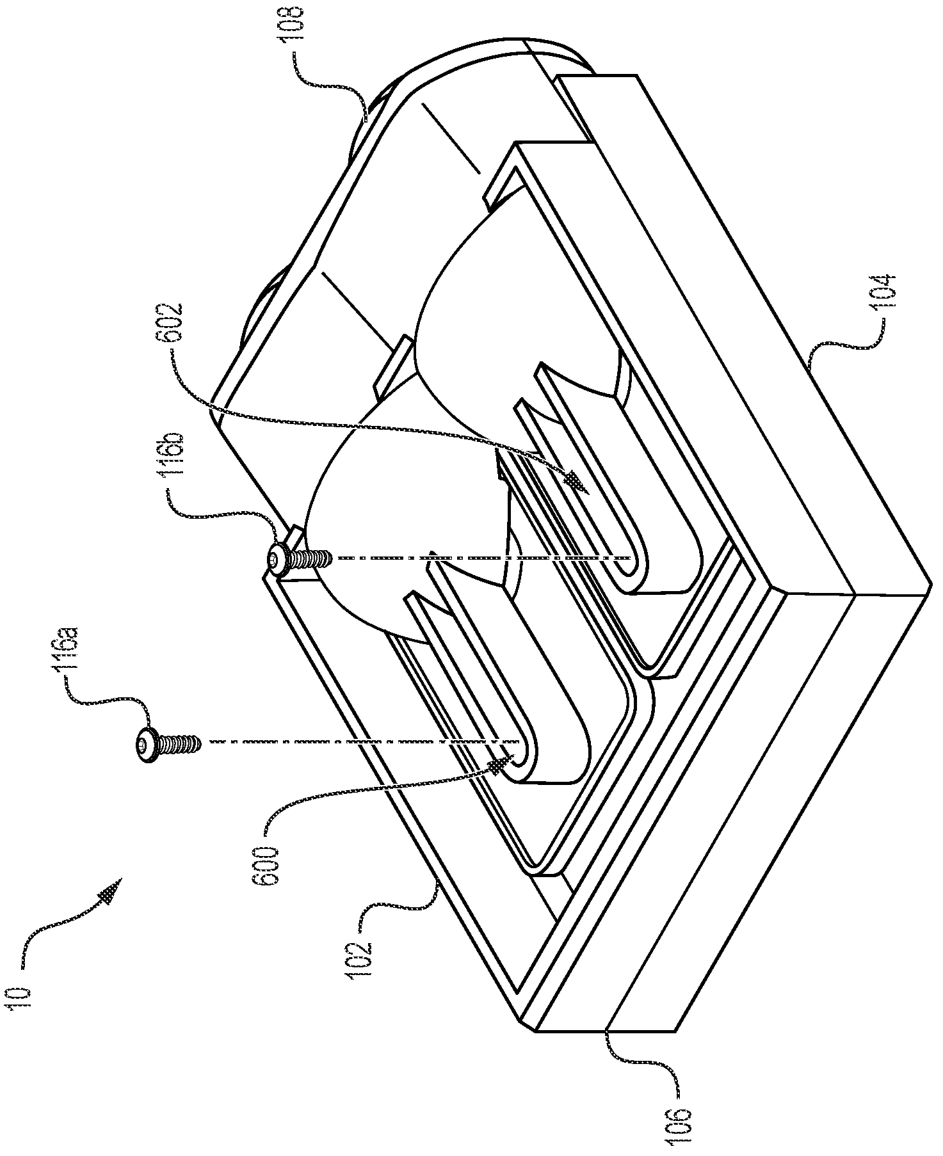
FIG. 6 is a rear perspective view showing insertion of screws into a side of the housing of the illumination device of FIG. 1.

FIG. 6 shows additional threaded fasteners **116*a*, 116*b* inserted through channels 600, 602 of the housing 100 for adjustment of shield aiming. Here, the channels 600, 602 are again integral with the housing 100 and manufactured as part of the housing, without necessary additional components. Those skilled in the art would understand that various configurations could be used for the overall construction of the illumination device 10, wherein the resulting device 10 includes the housing 100 with a single-use living hinge 106. In other words, the device 10** can be adapted for use in a plurality of vehicle environments, and for a plurality of vehicle make and models.

Figure 7:
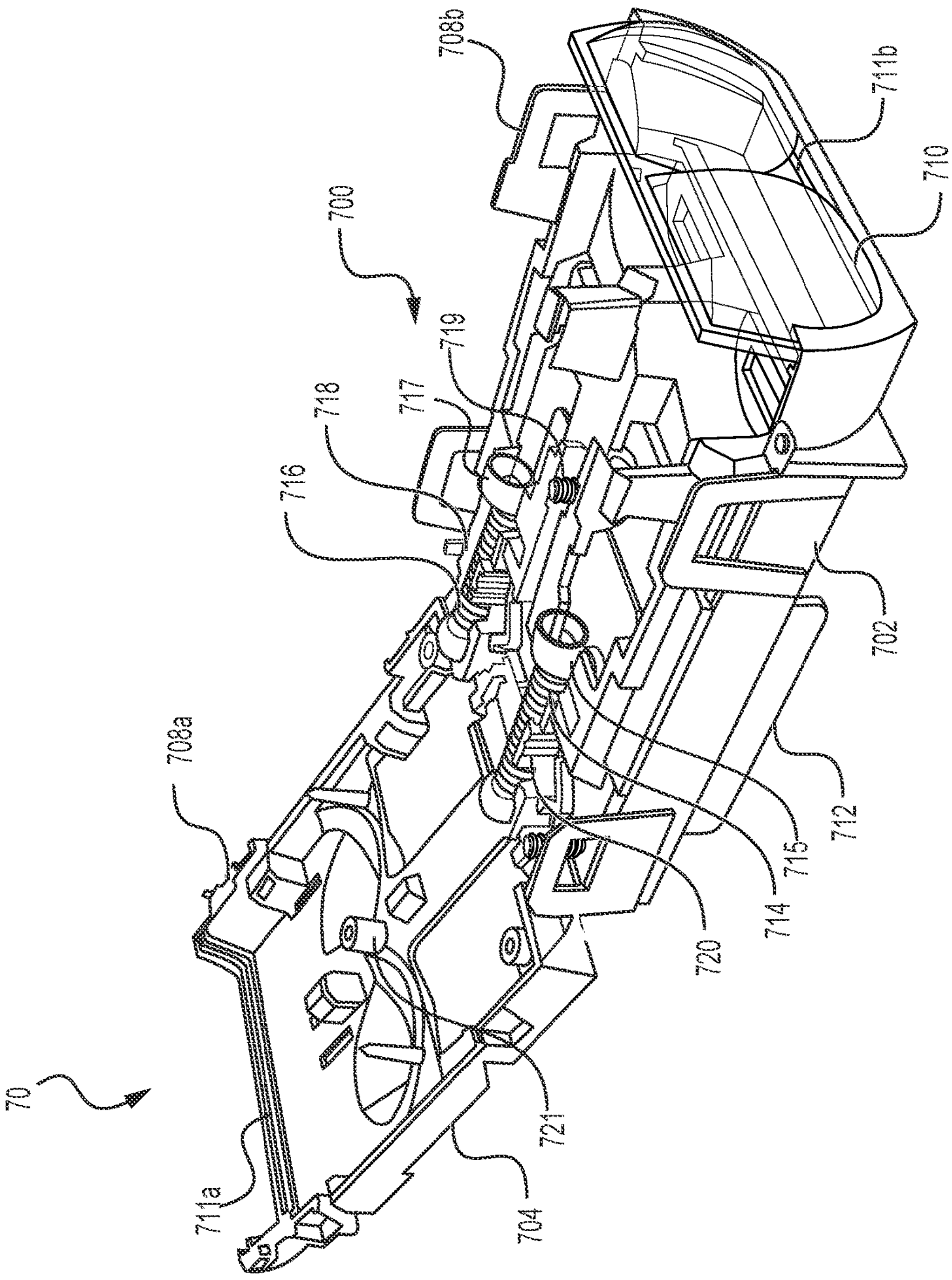
FIG. 7 is a front perspective view of an alternative embodiment of an illumination device in an open configuration and in accordance with the present invention.
Figure 8:
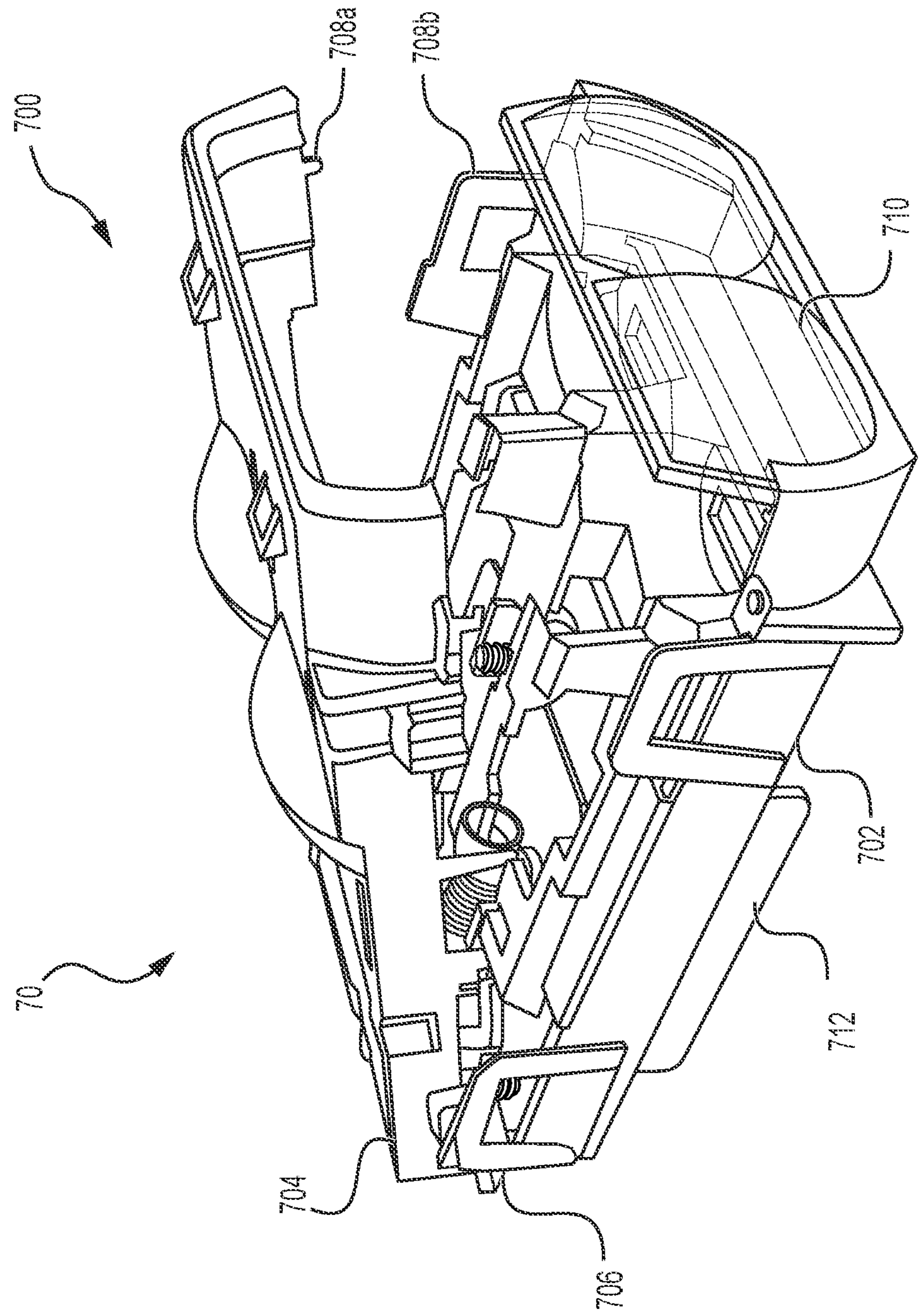
FIG. 8 is another front perspective view of the illumination device of FIG. 7 in a partially closed configuration.
Figure 9:
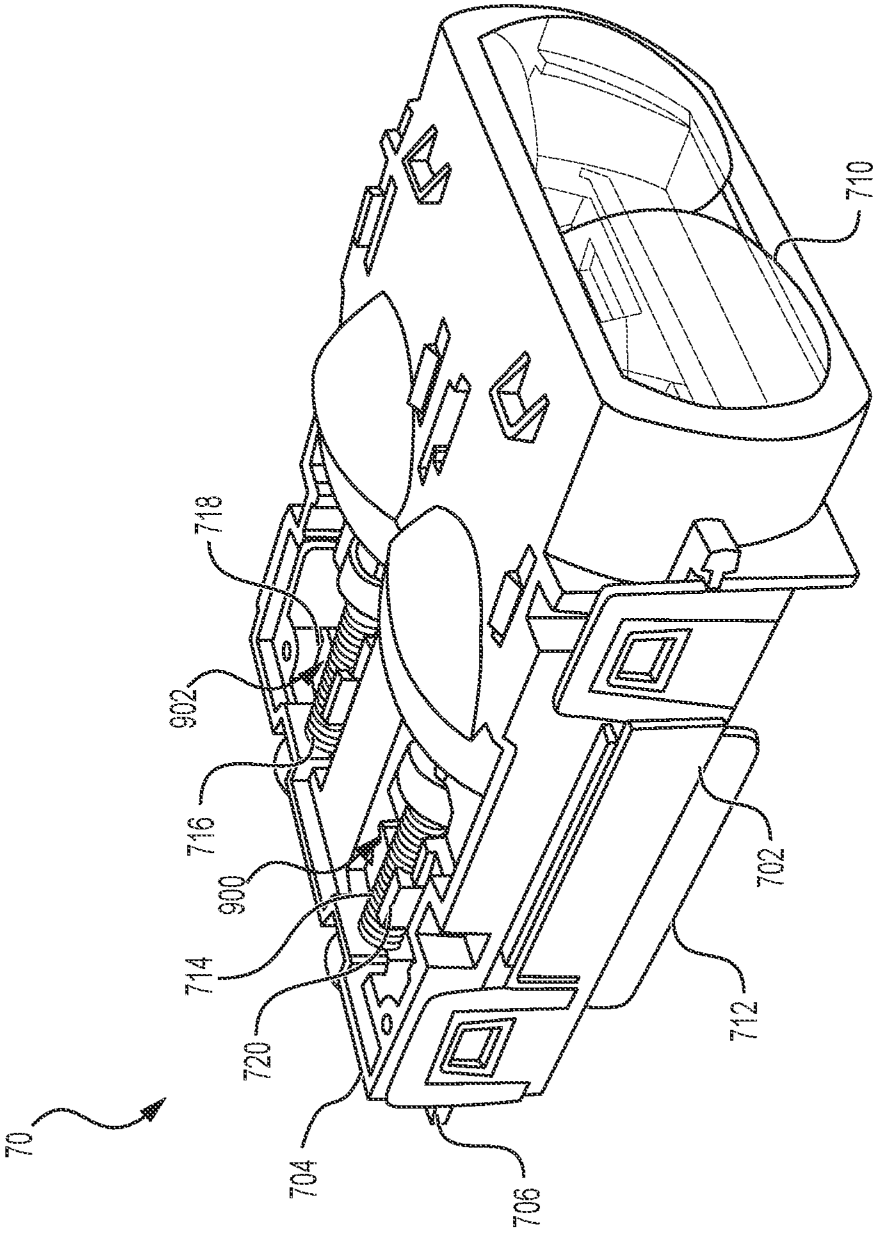
FIG. 9 is another front perspective view of the illumination device of FIG. 7 in a fully closed configuration.

In FIGS. 7-9, an alternative embodiment of an illumination device 70 is shown.

Here, the illumination device 70 includes a housing 700 with a first side 702 and a second side 704 connected by a hinge 706. The hinge 706 functions as discussed above, specifically by allowing the sides 702, 704 to fold together to form a closed configuration of the housing 700. Illumination device 70 further shows an example of clips **708*a*, 708*b* extending from the housing 700 and configured to secure the housing in a closed configuration. The clips 708*a*, 708*b* shown could vary in style, number, and other features. The clips 708*a*, 708*b* are integral with the housing 700 and manufactured with the housing 700**, as opposed to being added in an additional step.

Illumination device 70 further includes other necessary components for operation, such as at least one lens 710 and at least one light engine 712 mounted or otherwise secured to the housing 700. The lens 710 is again configured to secure within channels **711*a*, 711*b* as part of the housing 700. The illumination device 70 can further include one or more threaded fasteners 714, 716 and flexible holders 718, 720 for longitudinal adjustment of a shield (not shown). In embodiments, the holders 718, 720 extend from side 702 to support the threaded fasteners 714, 716, while the second side 704 includes openings 900, 902 as shown in FIG. 9 for providing exterior access to the threaded fasteners 714, 716 when the housing is in the closed configuration. The fasteners 714, 716 are also supported via guides 715, 717 as part of the housing 100**.

Illumination device 70 includes other components for fully assembling device 70. For example, a central fastener 719 extends through side 702 and into a receiver 721 as part of side 704, to fully secure the sides together.

Illumination devices 10, 70 provide for novelty over the current state of the art by incorporating a single-use hinge between the two sides of the housing. The hinge is molded and manufactured along with the housing sides and other housing components, creating a single, unified unit. For example, a single machine may be used during the manufacturing process of the housing to create the housing in the open configuration. During the assembly process, the housing is then folded about the hinge to secure the lens and other necessary components thereto. This feature greatly improves efficiency during manufacturing and assembling.

Figure 10:
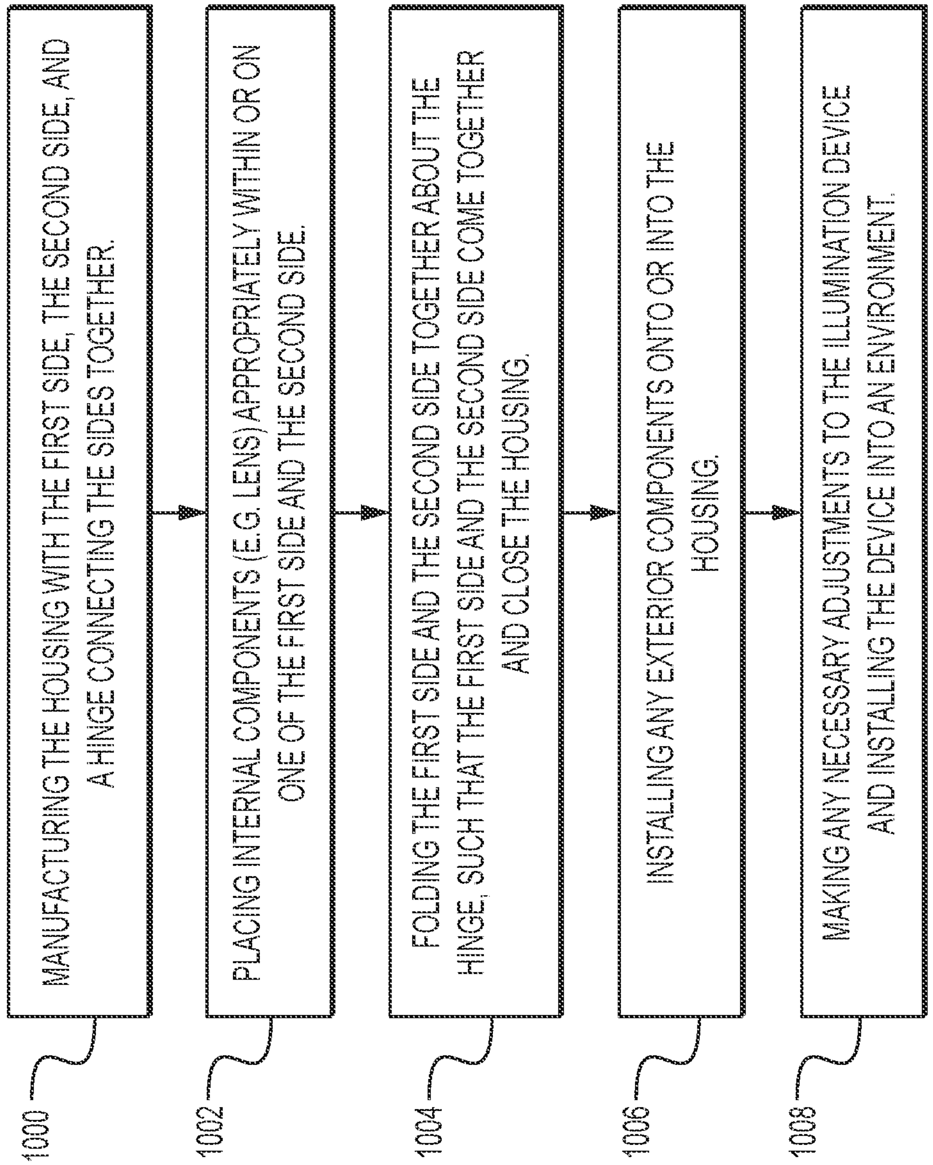
FIG. 10 is a method of assembling and installing an illumination device in accordance with the present invention.

In FIG. 10, a flowchart depicts a method of assembling an illumination device (e.g. device 10 or 70) in accordance with the present invention. At step 1000, the housing is manufactured with the first side and the second side connected by a hinge. In embodiments, the first side, second side, and hinge are manufactured as a single unit, such as through injection molding or similar manufacturing processes. Other components of the housing are also manufactured at this step as part of the integral single unit, such as housing clips, fastener guides, etc. In other words, all components that are reasonably possible to manufacture into one component, such as through injection molding or similar processes, are accordingly manufactured such that the lowest reasonable number of components are needed.

At step 1002, the lens, as well as other internal components are appropriately placed within or secured to one side of the housing. For example, the lens may be secured within a first channel of one of the first side or second side.

At step 1004, the housing is folded about the hinge, where the first side and the second side come together and secure into a closed configuration. In this step, the necessary internal components are secured within the body, for example, the lens may be secured within the first channel and a second channel. The housing is fully closed at this step, through use of exterior clips and/or other fasteners, such as one or more screws extending through both sides.

At step 1006, exterior components are installed into or onto the illumination device.

At step 1008, once the illumination device is fully assembled, any necessary adjustments can be performed and the device is installed into a designated environment, such as a vehicle headlamp space, for use.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An illumination device for use with a motor vehicle, the illumination device comprising:

a housing having a first side and a second side connected via a hinge, the hinge configured to allow the first side and the second side to fold together to form a closed configuration of the housing;

the first side having a first lens securing mechanism embedded into the first side and the second side having a second lens securing mechanism embedded into the second side, wherein the first lens securing mechanism and the second lens securing mechanism are unaligned when the housing is in an open configuration and wherein the first lens securing mechanism and the second lens securing mechanism align in the closed configuration such that the first lens securing mechanism and the second lens securing mechanism are configured to retain a lens therein when in the closed configuration; and one or more internal components configured to secure within the housing when in the closed configuration;

wherein the first side, the second side, and the hinge are manufactured as a single unit; and wherein the housing is configured to mount within an environment of the motor vehicle.

2. The illumination device of claim 1, wherein the first side, the second side, and the hinge are composed of a material.

3. The illumination device of claim 2, wherein the first side, the second side, and the hinge are manufactured through injection molding.

4. The illumination device of claim 1, wherein the hinge extends a width of the housing.

5. The illumination device of claim 4, wherein the hinge further comprises a weak line extending the width of the housing and configured to provide a location of bend for the hinge.

6. The illumination device of claim 1, wherein the housing further comprises one or more clips configured to secure the housing in the closed configuration.

7. The illumination device of claim 1, wherein the one or more internal components further comprises:

the lens secured within the first lens securing mechanism of the first side and the second lens securing mechanism of the second side when the housing is in the closed configuration; and one or more threaded fasteners mounted via one or more flexible holders within the housing, the one or more threaded fasteners configured to provide adjustability of the illumination device and accessible from an exterior of the housing.

8. The illumination device of claim 1, wherein the first lens securing mechanism is a first channel and the second lens securing mechanism is a second channel.

9. A method of assembling an illumination device for use with a motor vehicle, the method comprising:

manufacturing a housing having a first side and a second side connected via a hinge, the first side, the second side, and the hinge manufactured as a single unit, the first side having a first lens securing mechanism embedded within the first side and the second side having a second lens securing mechanism embedded within the second side, wherein the first lens securing mechanism and the second lens securing mechanism are unaligned when the housing is in an open configuration;

securing one or more internal components to one or more of the first side and the second side of the housing;

folding the first side and the second side together about the hinge;

securing the first side and the second side together to create a closed configuration of the housing, wherein the first lens securing mechanism and the second lens securing mechanism align in the closed configuration such that the first lens securing mechanism and the second lens securing mechanism are configured to retain a lens therein when in the closed configuration and wherein the one or more internal components are affixed within the housing in the closed configuration; and installing one or more external components to the housing in the closed configuration to render an assembled illumination device;

wherein the assembled illumination device is configured for installation within an environment of the motor vehicle.

10. The method of claim 9, wherein manufacturing the housing further comprises using injection molding technology to manufacture the first side, the second side, and the hinge as the single unit.

11. The method of claim 9, wherein securing the first side and the second side together to create the closed configuration of the housing further comprises engaging one or more clips as part of the housing to retain the housing in the closed configuration.

12. The method of claim 9, wherein securing one or more internal components to one or more of the first side and the second side of the housing further comprises:

securing the lens within the first lens securing mechanism of the first side, the lens configured to engage with the second lens securing mechanism when the first side and the second side are folded together; and mounting one or more threaded fastener within the housing via one or more flexible holders, the one or more threaded fasteners configured to provide adjustability of the illumination device and accessible from an exterior of the housing.

13. The method of claim 9, wherein the hinge is configured to allow the first side and the second side to fold together a single time.

14. The method of claim 9, wherein the hinge extends a width of the housing.

15. The method of claim 14, wherein the hinge further comprises a weak line extending the width of the housing and configured to provide a location of bend for the hinge.

16. The method of claim 9, wherein the first lens securing mechanism is a first channel and the second lens securing mechanism is a second channel.

* * * * *